UNITED STATES PATENT OFFICE 2,556,515

METHINE DYES CONTAINING A 3-ARYL-4-THIAZOLIDONE NUCLEUS

Leslie G. S. Brooker and Frank L. White, Rochester, N. Y., assignors to Eastman Kodak Company, Rochester, N. Y., a corporation of New Jersey No Drawing. Application January 2, 1948, Serial No. 367

7 Claims. (Cl. 260—240.7)

This invention relates to methine dyes containing a 3-aryl-4-thiazolidone nucleus, and to a process for preparing them.

The dyes of our invention can be represented by the following general formula:

I. 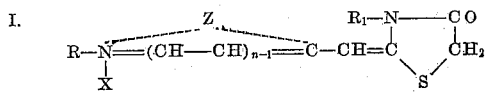

wherein R represents an alkyl group, i. e. an alcohol radical, e. g. methyl, ethyl, n-propyl, n-butyl, isobutyl, n-amyl, isoamyl, β-hydroxyethyl, γ-hydroxypropyl, β-methoxyethyl, β-ethoxyethyl, allyl, benzyl (phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β-carbomethoxyethyl, carbethoxymethyl, β-carbethoxyethyl, etc., $n$ represents a positive integer of from 1 to 2, $R_1$ represents an aryl group, e. g. phenyl, α-naphthyl, β-naphthyl, o-tolyl, m-tolyl, p-tolyl, etc., X represents an anion, e. g. chloride, bromide, iodide, acetate, propionate, n-butyrate, perchlorate, thiocyanate, etc., and Z represents the non-metallic atoms necessary to complete a heterocyclic nucleus selected from the group consisting of heterocyclic nuclei of the thiazole series (e. g. thiazole, 4-methylthiazole, 4-phenylthiazole, 4,5-dimethylthiazole, 4,5-diphenylthiazole, 5-methylthiazole, 5-phenylthiazole, 4-(2-thienyl)thiazole, etc.), heterocyclic nuclei of the benzo thiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 4-methoxybenzothiazole, 5-methoxybenzothiazole, 6-methoxybenzothiazole, 5-bromobenzothiazole, 6-bromobenzothiazole, 5-iodobenzothiazole, 6-iodobenzothiazole, 4-phenylbenzothiazole, 5-phenylbenzothiazole, 4-ethoxybenzothiazole, 5-ethoxybenzothiazole, tetrahydrobenzothiazole, 5,6-dimethoxybenzothiazole, etc.) heterocyclic nuclei of the α-naphthothiazole series, heterocyclic nuclei of the β-naphthothiazole series, heterocyclic nuclei of the benzoselenazole series (e. g. benzoselenazole, 5-chlorobenzoselenazole, tetrahydrobenzoselenazole, etc.), heterocyclic nuclei of the thiazoline series, heterocyclic nuclei of the 3,3-dimethylindolenine series and heterocyclic nuclei of the quinoline series (e. g. quinoline, 6-methylquinoline, 7-methylquinoline, 8-methylquinoline, 6-chloroquinoline, 8-chloroquinoline, 4-chloroquinoline, 5-ethoxyquinoline, 6-ethoxyquinoline, 7-ethoxyquinoline, 6-methoxyquinoline, etc.), and R represents an aryl group, e. g. phenyl, when Z represents the nonmetallic atoms necessary to complete a heterocyclic nucleus of the benzothiazole or thiazoline series.

We prepare the dyes represented by Formula I above by condensing a halogeno-ester selected from those represented by the following general formula:

II. 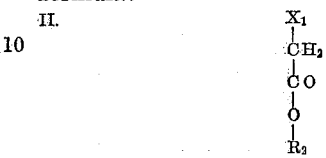

wherein $X_1$ represents a halogen atom, e. g. a chlorine atom, a bromine atom or an iodine atom, and $R_2$ represents an alkyl group, e. g. methyl, ethyl, n-propyl, n-butyl, isopropyl, isobutyl, sec-butyl, n-amyl, isoamyl, etc., or an aryl group, e. g. phenyl, etc. with a 2-arylamino-2-thioethylidene compound selected from those represented by the following general formula:

III. 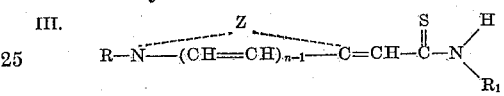

wherein R, $n$ and $R_1$ have the values given above and Z represents (as in Formula I) the non-metallic atoms necessary to complete a heterocyclic nucleus selected from the group consisting of heterocyclic nuclei of the 4-thiazoline series, heterocyclic nuclei of the thiazolidine series, heterocyclic nuclei of the benzothiazoline series, heterocyclic nuclei of the α-naphthothiazoline series, heterocyclic nuclei of the β-naphthothiazoline series, heterocyclic nuclei of the benzoselenazoline series, heterocyclic nuclei of the dihydroquinoline series and heterocyclic nuclei of the 3,3-dimethylindoline series.

Typical halogeno esters include methyl bromoacetate, ethyl bromoacetate, n-propyl bromoacetate, isopropyl bromoacetate, n-butyl bromoacetate, isobutyl bromoacetate, tert.-butyl bromoacetate, allyl bromoacetate, phenyl bromoacetate, methyl chloroacetate, ethyl chloroacetate, n-propyl chloroacetate, benzyl chloroacetate, phenyl chloroacetate, methyl iodoacetate, ethyl iodoacetate, n-propyl iodoacetate, etc.

Typical 2-arylamino-2-thioethylidene compounds include 2-(2-anilino-2-thioethylidene)-3-ethylbenzothiazoline, 2-(2-anilino-2-thiothylidene)-1-ethyl-β-naphthothiazoline, 2-(2-anilino-2-thioethylidene)-3-ethylbenzoselenazoline, 2-(2-anilino-2-thioethylidene)-1-ethyl-1,2-dihydroquinoline, 2-(2-anilino-2-thioethylidene)-3-ethyl-4-methyl-4-thiazoline, 2-(2-anilino - 2 - thioethylidene) -3-methylthiazolidine, 2-(2-anilino-2-thioethylidene) - 1,3,3 - trimethylindoline, 4-(2-anilino - 2 - thioethylidene) -1-methyl-1,4-dihydroquinoline, etc. These 2 - arylamino-2-thioethylidene compounds are described in our copending application Serial No. 368, filed of even date herewith, "2-Acylated Arylamino - 2 - Thioethylidene Derivatives of Heterocyclic Nitrogen Bases."

The following examples will serve to illustrate further the manner of obtaining the dyes of our invention:

*Example 1.—2[(2-benzothiazolyl ethiodide)-methylene]-3-phenyl-4-thiazolidone*

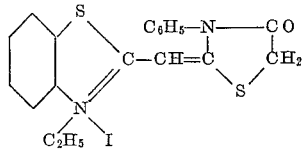

6.24 g. (1 mol.) of 2-(2-anilino-2-thioethylidene)-3-ethylbenzothiazoline and 8.35 g. (1 mol.+150% excess) of ethyl bromoacetate were heated together at the temperature of the steam bath for 30 minutes. The resulting cake of crystals was crushed to a finely divided mass, stirred with acetone, filtered and the residue on the filter washed with acetone. The washed residue was dissolved in 100 cc. of hot methyl alcohol and to the hot solution was added an aqueous solution of 8 g. of potassium iodide in 800 cc. of water. After chilling the resulting mixture at 0° C., the above-formulated dye was collected on a filter and washed with acetone. The yield of crude dye was 72 per cent. The dye was dissolved in hot methyl alcohol (170 cc.) and the resulting solution was refluxed 30 minutes with 0.5 g. of activated charcoal. After filtering, the filtrate was chilled rapidly in a freezing mixture of ice and acetone. The dye which separated was collected on a filter and washed with methyl alcohol. After two more treatments with activated charcoal, the yield of dye was 23 per cent. The greenish crystals of dye melted at 245° C. with softening and decomposition from 242° C.

*Example 2.—2-[(2-β-naphthothiazolyl ethobromide)methylene]-3-phenyl-4-thiazolidone*

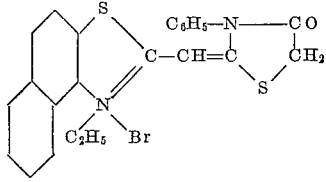

7.24 g. (1 mol.) of 2-(2-anilino-2-thioethylidene)-1-ethyl-β-naphthothiazoline and 8.35 g. (1 mol.+150% excess) of ethyl bromoacetate were heated together at the temperature of the steam bath for 20 minutes. The cool reaction mixture was stirred with 20 cc. of acetone and the suspension chilled at 0° C. The above-formulated dye was collected on a filter and washed with acetone. The yield of dye was 93 per cent crude and 85 per cent after one recrystallization from methyl alcohol (30 cc. per gram of dye). The dye was further purified by dissolving in hot methyl alcohol and treating the hot methyl alcohol solution with activated charcoal for 30 minutes. The charcoal was filtered off and the filtrate chilled rapidly. The dye which separated was collected on a filter and washed with methyl alcohol. After one further purification with activated charcoal, the yield of dye was 45 per cent. The pure dye was obtained as pale greenish crystals melting at 298 to 299° C. with decomposition.

*Example 3.—2-[(2-quinolyl ethoperchlorate)-methylene]-3-phenyl-4-thiazolidone*

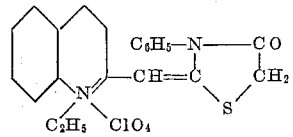

3.06 g. (1 mol.) of 2-(2-anilino-2-thioethylidene)-1-ethyl-1,2-dihydroquinoline, and 5.01 g. (3 mols.) of ethyl bromoacetate were heated together at the temperature of the steam bath for 20 minutes, during which time the mixture was frequently shaken. Upon cooling, about 10 cc. of acetone was added to the dark sticky mass to give a solution. The solution was chilled to 0° C. The solid which separated was filtered off and washed with acetone. The yield was 23 per cent. The washed product was dissolved in hot methyl alcohol and a hot aqueous solution of potassium iodide was added to the methyl alcohol solution. Upon cooling 2-[(2-quinolyl ethoiodide)methylene] - 3-phenyl-4-thiazolidone separated out. This was dissolved in hot methyl alcohol and a concentrated aqueous solution of sodium perchlorate was added to the hot methyl alcohol solution. Upon cooling, the above-formulated dye separated out. The dye was dissolved in hot methyl alcohol, activated charcoal added and the whole refluxed for 15 minutes. The charcoal was filtered off and the filtrate chilled. The purified crystals of dye which separated were filtered off and washed with methyl alcohol. The dye was twice recrystallized from methyl alcohol with rapid chilling and once from ethyl alcohol with rapid chilling. The dye was obtained as pale greenish crystals, melting at 235 to 236° C. with decomposition.

In Example 1, substituting an equimolecular proportion of 2-(2-anilino-2-thioethylidene)-3-ethylbenzoselenazoline for the benzothiazoline compound, 2[(2 - benzoselenazolyl ethiodide)-methylene]-3-phenyl-4-thiazolidone can be obtained. In Example 1, substituting an equimolecular proportion of 2-(2-anilino-2-thioethylidene)-3-ethyl-4-methyl-4-thiazoline for the benzothiazoline compound, 2-{[2 - (4 - methylthiazolyl)ethiodide]methylene} - 3 - phenyl - 4-thiazolidone can be obtained. In Example 3, substituting an equimolecular proportion of 4-(2-anilino-2-thioethylidene)-1-methyl-1,4-dihydroquinoline for the 1,2-dihydroquinoline compound, 2-[(4-quinolyl ethoperchlorate) methylene]-3-phenyl-4-thiazolidone can be obtained. In a similar manner any of the halogeno esters and any of the 2-arylamino-2-thioethylidene compounds can be condensed to give dyes.

Methine dyes containing a 3-aryl-4-thiazolidone nucleus are especially useful as intermediates for the preparation of complex dyes of the merocyanine type, i. e. dyes which can be represented by the following general formula:

IV.

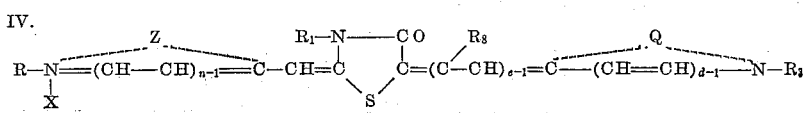

wherein R, R₁, n, X and Z have the values given above under Formula I, and d and e each represents a positive integer of from 1 to 2, R₃ represents an alkyl group, e. g. those set forth above for R, R₈ represents a hydrogen atom, an alkyl group, e. g. methyl, ethyl, n-propyl, n-butyl, isobutyl, etc., or an aryl group, e. g. phenyl, p-tolyl, o-tolyl, m-tolyl, etc., and Q represents the non-metallic atoms necessary to complete a heterocyclic nucleus containing from 5 to 6 atoms in the heterocylic ring, e. g. heterocyclic nuclei of the 4-thiazoline series (e. g. 4-thiazoline, 4-methyl-4-thiazoline, 4-phenyl-4-thiazoline, 4,5-dimethyl-4-thiazoline, 4,5-diphenyl-4-thiazoline, 5-methyl-4-thiazoline, 5-phenyl-4-thiazoline, 4-(2-thienyl)-4-thiazoline, etc.), heterocyclic nuclei of the benzothiazoline series (e. g. benzothiazoline, 4-chlorobenzothiazoline, 5-chlorobenzothiazoline, 6-chlorobenzothiazoline, 7-chlorobenzothiazoline, 4-methylbenzothiazoline, 5-methylbenzothiazoline, 6 - methylbenzothiazoline, 4 - methoxybenzothiazoline, 5-methoxybenzothiazoline, 6-methoxybenzothiazoline, 5-bromobenzothiazoline, 5-iodobenzothiazoline, 6-iodobenzothiazoline, 4-phenylbenzothiazoline, 5-phenylbenzothiazoline, 4-ethoxybenzothiazoline, 5-ethoxybenzothiazoline, tetrahydrobenzothiazoline, 5,6-dimethoxybenzothiazoline, etc.), heterocyclic nuclei of the α-naphthothiazoline series, heterocyclic nuclei of the β-naphthothiazoline series, heterocyclic nuclei of the benzoselenazoline series (e. g. benzoselenazoline, 5-chlorobenzoselenazoline, tetrahydrobenzoselenazoline, etc.), heterocyclic nuclei of the thiazolidine series, heterocyclic nuclei of the 3,3-dimethylindoline series, heterocyclic nuclei of the 1,2- and 1,4-dihydroquinoline series (e. g. 1,2-dihydroquinoline, 1,4-dihydroquinoline, 6-methyl-1,2-dihydroquinoline, 7-methyl-1,2-dihydroquinoline, 8-methyl-1,2-dihydroquinoline, 6-chloro-1,2-dihydroquinoline, 8-chloro-1,2-dihydroquinoline, 4-chloro-1,2-dihydroquinoline, 5-ethoxy-1,2-dihydroquinoline, 6-ethoxy-1,2-dihydroquinoline, 7-ethoxy-1,2-dihydroquinoline, 6-methoxy-1,2-dihydroquinoline, etc.), heterocyclic nuclei of the 4-oxazoline series, (e. g. 4-oxazoline, 4-methyl-4-oxazoline, 4-phenyl-4-oxazoline, 5-methyl-4-oxazoline, 4-ethyl-4-oxazoline, 4,5-diphenyl-4-oxazoline, 4,5-dimethyl-4-oxazoline, etc.), heterocyclic nuclei of the benzoxazoline series (e. g. benzoxazoline, 5-chlorobenzoxazoline, 5-phenylbenzoxazoline, 5-methylbenzoxazoline, 6-methylbenzoxazoline, 5,6-dimethylbenzoxazoline, 6-methoxybenzoxazoline, 5-methoxybenzoxazoline, 5-ethoxybenzoxazoline, etc.), heterocyclic nuclei of the 4-selenazoline series, (e. g. 4-methyl-4-selenazoline, 4-phenyl-4-selenazoline, etc.), heterocyclic nuclei of the α-naphthoxazoline series, heterocyclic nuclei of the β-naphthoxazoline series, heterocyclic nuclei of the selenazolidine series, etc., and R₈ represents an aryl group, e. g. phenyl when Z represents the non-metallic atoms necessary to complete a heterocyclic nucleus of the benzothiazoline series and the thiazolidine series. These complex merocyanine dyes represented by Formula IV are known and have been described in United States Patent 2,388,963, dated November 13, 1945. Our new process provides a valuable means for producing these complex merocyanine dyes.

The complex merocyanine dyes represented by Formula IV (wherein e represents 2 and R₈ represents a hydrogen atom) are prepared according to our new process by condensing one of the dyes represented by Formula I with a cyclammonium quaternary salt containing in a reactive position (i. e. the alpha or gamma position) a β-arylaminovinyl group, i. e. a cyclammonium quaternary salt selected from those represented by the following general formula:

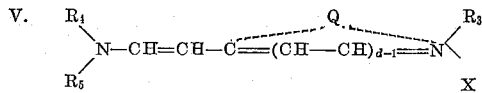

V.

wherein d and R₃ have the values given above in Formula IV and R₄ represents an aryl group, e. g. phenyl, p-chlorophenyl, p-tolyl, etc., and R₅ represents a hydrogen atom, an alkyl group (especially methyl and ethyl) and an acyl group (especially acetyl, propionyl, butyryl or isobutyryl), X represents an anion, e. g. chloride, bromide, iodide, methylsulfate, ethylslfate, p-toluenesulfonate, benzenesulfonate, acetate, propionate, etc. and Q represents the non-metallic atoms necessary to complete a heterocyclic nucleus containing from 5 to 6 atoms in the heterocyclic ring, e. g. heterocyclic nuclei of the thiazole series, the benzothiazole series, the α-naphthothiazole series, the β-naphthothiazole series, the benzoselenazole series, the thiazoline series, the 3,3-dimethylindolenine series, the quinoline series, the oxazole series, the benzoxazole series, the α-naphthoxazole series, the β-naphthoxazole series, the selenazole series, the selenazoline series, etc.

Among the β-arylaminovinyl compounds represented by the Formula V are: 2-β-acetanilidovinylbenzoxazole ethiodide, 2-β-acetanilidovinylbenzothiazole, 2 - β - acetanilidovinylquinoline ethiodide, 4-β-acetanilidovinylquinoline n-butiodide, 2-β-acetanilidovinyl - β - naphthothiazole ethiodide, 2-anilinovinylthiazoline methiodide, 2-β-acetanilidovinylbenzothiazole pheniodide, 2-β-acetanilidovinylbenzoselenazole ethiodide, 2-β-acetanilidovinyl-4-phenylthiazole ethiodide, 2-β-acetanilidovinyl-3,3'-dimethylindolenine methiodide, 2-[β-(N-methylanilino) vinyl]-benzothiazole ethiodide, 2-(β-acetanilido)-3,4-trimethylenebenzothiazolium iodide, 2-β-anilinovinyl-3-phenylthiazolinium perchlorate, 2 - β - anilinovinyl-3-α-naphthylthiazolinium perchlorate, etc. These β-arylaminovinyl compounds are known for the most part and can be prepared by fusing a diarylformamidine with a cyclammonium quaternary salt containing a reactive methyl group. The acylarylaminovinyl compounds are formed by heating the diarylformamidine with the cyclammonium quaternary salt in a carboxylic anhydride, e. g. acetic, propionic or butyric anhydride. 2-β-anilinovinyl - 3 - phenylthiazolinium perchlorate and 2-β-anilinovinyl-3-α-naphthylthiazolinium perchlorate are described in the copending application of L. G. S. Brooker, Serial No. 622,677, filed October 16, 1945, now U. S. Patent 2,441,558, issued May 18, 1948.

The condensations between the dyes of Formula I and the β-arylaminovinyl compounds of Formula V are advantageously carried out in the presence of a basic condensing agent, e. g. a tertiary organic amine, for instance pyridine, quinoline, isoquinoline, triethylamine, tri-n-propylamine, tri-n-butylamine, triisoamylamine, N-methylpiperidine, N-ethylpiperidine, etc. Diluents may also be used, e. g. lower aliphatic alcohols, for instance, ethyl alcohol, isopropyl alcohol, n-propyl alcohol, n-butyl alcohol, etc.

The complex merocyanine dyes represented by Formula IV (wherein e represents 2 and R₈ represents an alkyl, a cycloalkyl or an aryl group) can be prepared according to the process by condensing one of the dyes represented by Formula I with a cyclammonium quaternary salt containing in a reactive position (i. e. the alpha or gamma position) a β-alkylmercapto-β-alkyl (or aryl) vinyl cylammonium quaternary salt selected from those represented by the following general formula:

VI.
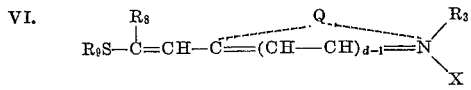

wherein $d$, $R_3$, $X$ and $Q$ have the values given above in Formula V, and $R_8$ has the value given above in Formula IV and $R_9$ represents an alkyl group, e. g. methyl, ethyl, n-propyl, isobutyl, n-butyl, benzyl, etc.

Among the β-alkylmercapto-β-alkyl (or aryl)-vinyl cyclammonium quaternary salts represented by Formula VI are: 2-(2-methylmercapto-1-butenyl)benzothiazole metho-p-toluenesulfonate, 2-(2-methylmercaptopropenyl)-β-naphthothiazole metho-p-toluenesulfonate, 2-(2-methylmercaptopropenyl)-3,4-trimethylene-benzothiazolium p-toluenesulfonate, 2-(2-methylmercaptopropenyl)benzothiazole etho-p-toluenesulfonate, 2-(2-methylmercapto-1-butenyl)-benzothiazole metho-p-toluenesulfonate, 5-chloro-2-(2-methylmercapto-1-butenyl)-benzoselenazole metho-p-toluenesulfonate, 2-(2-methylmercaptostyryl)-β-naphthothiazole ethiodide, 5-chloro-2-(2-methylmercaptopropenyl)-benzothiazole ethiodide, 2-(2-methylmercaptopropenyl)quinoline etho-p-toluenesulfonate, 2-(2-methylmercaptopropenyl)-4-phenylthiazole etho-p-toluenesulfonate, 2(2-cyclopropyl-2-methylmercaptovinyl)benzothiazole metho-p-toluenesulfonate, 2-(2-cyclopropyl-2-methylmercaptovinyl)-β-naphthothiazole metho-p-toluenesulfonate, 5-chloro-2(2-cyclopropyl-2-methylmercaptovinyl)benzothiazole metho-p-toluenesulfonate, 2-(2-cyclopropyl-2-methylmercaptovinyl)benzoselenazole metho-p-toluenesulfonate, 2-(2-cyclobutyl-2-methylmercaptovinyl)benzothiazole metho-p-toluenesulfonate, 2-(2-cyclohexyl-2-methylmercaptovinyl)benzothiazole metho-p-toluenesulfonate, 3,3-dimethyl-2-(2-methylmercaptovinyl)indolenine methiodide, etc. Many of these alkylmercapto compounds are known, being described for example in United States Patents 2,369,646 and 2,369,657, each dated February 20, 1945. Still others are described in United States Patent 2,429,469, dated October 21, 1947, and in the copending application Serial No. 620,162, filed October 3, 1945, by G. H. Keyes, now United States Patent 2,436,173 issued October 25, 1949. The condensations involving the alkylmercapto compounds of Formula VI are advantageously carried out in the presence of a basic condensing agent, e. g. the tertiary amines set forth above as basic condensing agents. Diluents may also be used, e. g. lower aliphatic alcohols, for instance, ethyl, isopropyl, n-propyl and n-butyl alcohols.

The complex merocyanine dyes represented by Formula IV (wherein $e$ represents 1) are prepared according to our new process by condensing one of the dyes represented by Formula I with a cyclammonium quaternary salt containing in a reactive position (i. e. the alpha or gamma position) a thioether group, i. e. a cyclammonium quaternary salt selected from those represented by the following general formula:

VII.
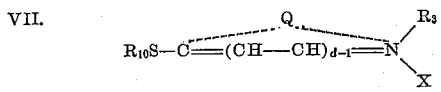

wherein $d$, $Q$, $R_3$ and $X$ have the values given above under Formula VI, and $R_{10}$ represents an alkyl or an aryl group, e. g. methyl, ethyl, n-propyl, n-butyl, isobutyl, phenyl, p-chlorophenyl, β-naphthyl, etc.

Typical of the thioether compounds represented by Formula VI are: 2-methylmercaptobenzothiazole metho-p-toluenesulfonate, 2-phenylmercaptoquinoline ethiodide, 2-ethylmercapto-5,6-dimethoxybenzothiazole etho-p-toluenesulfonate, 2-methylmercaptobenzoxazole etho-p-toluenesulfonate, 2-methylmercapto-5,6-dimethylbenzoxazole etho-p-toluenesulfonate, 2-methylmercapto-β-naphthoxazole etho-p-toluenesulfonate, 2-methylmercapto-5-methylbenzoxazole etho-p-toluenesulfonate, 2-methylmercaptobenzothiazole ethiodide, 2-(p-chlorophenylmercapto)quinoline ethiodide, 2-(2-benzothiazolylmercapto)quinoline ethiodide, 2-(β-naphthylmercapto)pyridine ethiodide, 2-(p-tolylmercapto)quinoline ethiodide, 4-phenylmercaptopyridine methiodide, etc.

The condensations are advantageously carried out in the presence of a basic condensing agent, e. g. the tertiary amines set forth above in connection with the β-arylaminovinyl compounds. Diluents may also be used, e. g. lower aliphatic alcohols, for instance, ethyl alcohol, isopropyl alcohol, n-propyl alcohol, n-butyl alcohol, etc.

The following examples will serve to illustrate further the manner of obtaining the complex merocyanine dyes in accordance with our process.

*Example 4.*—2-[(2-benzothiazolyl ethiodide)-methylene]-5-[(3-ethyl-2(3)-benzoxazolylidene)ethylidene]-3-phenyl-4-thiazolidone

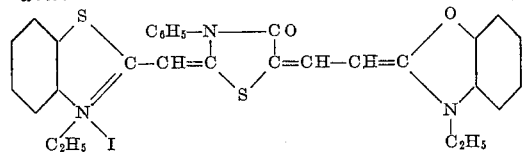

1.94 g. (1 mol.) of 2-[(2-benzothiazolyl ethochloride)methylene]-3-phenyl-4-thiazolidone and 2.17 g. (1 mol.) of 2-β-acetanilidovinyl-benzoxazole ethiodide were heated together in 20 cc. of pyridine at the temperature of the steam bath for 50 minutes. After chilling the reaction mixture, the solid was washed on the filter with methyl alcohol. The yield of dye was 52 per cent crude and 17 per cent after two recrystallizations from pyridine. The blackish-green crystals of the above-formulated dye had melting point of 252 to 254° C. with decomposition. The dye sensitized a photographic gelatino-silver-bromoiodide emulsion to about 640 mμ with maximum sensitivity at about 600 mμ.

*Example 5.*—5-[(3-ethyl-2(3)-benzoxazolylidene) ethylidene]-2-[(2-β-naphthothiazolyl ethiodide)methylene]-3-phenyl-4-thiazolidone

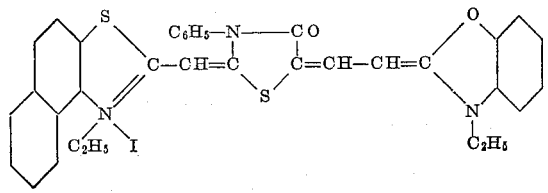

2.19 g. (1 mol.) of 2-[(2-β-naphthothiazolyl ethochloride) methylene]- 3 -phenyl- 4 -thiazolidone and 2.17 g. (1 mol.) of 2-β-acetanilidobenzoxazole ethiodide were heated together in 20 cc. of pyridine solution for 50 minutes. After chilling at 0° C., the dye was collected on a filter and washed with methyl alcohol. The residue was extracted with 300 cc. of hot methyl alcohol and then with 250 cc. of hot pyridine. The remaining residue was dissolved in 90 cc. of nitrobenzene at 175-180° C. The filtrate was chilled and the nitrobenzene solidified. A small portion of methyl alcohol was added and before all of the nitrobenzene had melted the solid was collected on a filter and washed with methyl alcohol. Ether was added to the unmelted nitrobenzene and then a further portion of dye was obtained. The yield of dye was 13 per cent, in two portions, and the second portion had melting point 296–299° C. with decomposition. The dye sensitized a photographic gelatino-silver-bromoiodide emulsion to about 640 mμ with maximum sensitivity at about 610 mμ.

*Example 6.—5 - [(3 - ethyl - 2 (3) - benzoxazolylidene) ethylidene]- 3 - phenyl - 2 -[(2 - quinolyl ethoperchlorate) methylene]-4-thiazolidone*

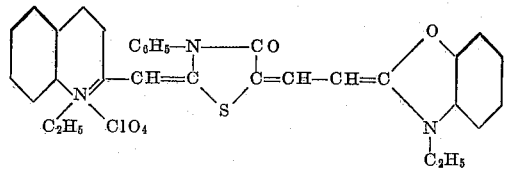

This dye was prepared as in Example 5 above from 2-[(2-quinolyl ethoperchlorate) methylene]-3-phenyl-4-thiazolidone and 2-β-acetanilidovinylbenzoxazole ethiodide in pyridine, except that heating was for 3 minutes at the boiling point. The cooled reaction mixture was stirred with diethyl ether and filtered. The dye on the filter was washed with further ether. The washed dye was stirred with hot methyl alcohol and the sticky portion became crystalline. The mixture was chilled, the dye collected on a filter and the dye washed with water and then with methyl alcohol. The dye was then dissolved in hot pyridine and the hot solution filter. On cooling crystals separated, but methyl alcohol was added to throw down more crystals. This purification step was repeated, and very dark crystals of the above-formulated dye melting at 274 to 276° C. with decomposition were obtained. The acetone solution of the dye was blue.

In a similar manner, dyes can be prepared by substituting an equimolecular proportion of any of the above named β-arylaminovinyl compounds for the β-acetanilidovinylbenzoxazole ethiodide employed in Examples 4, 5 and 6.

*Example 7. — 5 - ( 3 - methyl - 2 ( 3 ) - benzothiazolylidene) - 2 - [(2 - β - naphthothiazolyl ethobromide) methylene] - 3 - phenyl - 4 - thiazolidone*

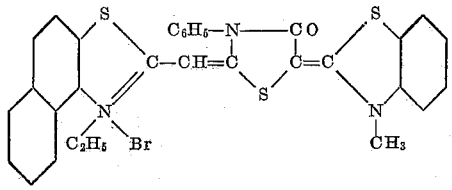

A suspension of 0.48 g. (1 mol.) of 2-[(2-β-naphthothiazolyl ethobromide)methylene] - 3 - phenyl-4-thiazolidone and 0.37 g. (1 mol.) of 2-methylmercaptobenzothiazole metho-p-toluenesulfonate in 20 cc. of pyridine was heated at the refluxing temperature for about three minutes. The cool reaction mixture was stirred with about 200 cc. of ether. After chilling, the dye was collected on a filter and washed first with ether and then methyl alcohol. The yield of dye was 88 per cent crude and 67 per cent after two purifications, which consisted in dissolving the dye in hot cresol, filtering and adding methyl alcohol to the hot filtrate. The minute reddish-orange crystals had melting point above 320° C. and they sensitized a photographic gelatino-silver-bromoiodide emulsions to about 570 mμ with maximum sensitivity about 540 mμ.

*Example 8.—2 - [(2 - benzothiazolyl ethiodide)-methyl] - 5 - (1 - ethyl - 2(1) - quinolyl - idene) 3 - phenyl - 4 - thiazolidone*

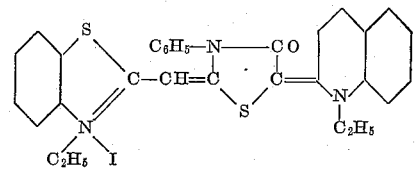

A suspension of 0.43 g. (1 mol.) of 2-[(2-benzothiazolyl ethiodide)methylene]- 3 - phenyl-4-thiazolidone and 0.39 g. (1 mol.) of 2-phenylmercaptoquinoline ethiodide in 10 cc. of pyridine was heated at the refluxing temperature for about three minutes. The cool reaction mixture was stirred with about 200 cc. of ether. After chilling, the dye was collected on a filter and washed first with ether and then methyl alcohol. The yield of dye was 98 per cent crude and 66 per cent after two recrystallizations from ethyl alcohol. The dark red crystals had melting point 219° C. with previous softening and they sensitized a photographic gelatino-silver-bromoiodide emulsion to about 590 mμ with maximum sensitivity about 570 mμ.

In a similar manner, dyes can be prepared by substituting an equimolecular proportion of any of the above-named thioether compounds for the 2-methylmercaptobenzothiazole metho-p-toluenesulfonate of Example 7 or the 2-phenylmercaptoquinoline ethiodide of Example 8.

The 3-aryl-4-thiazolidone compounds represented by Formula I are also valuable as intermediates for the preparation of a new kind of dye, viz. complex dialkylaminobenzylidene dyes which can be represented by the following general formula:

VII.

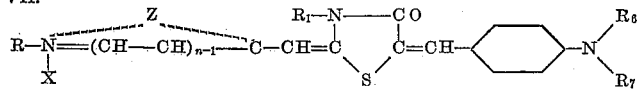

wherein R, X, n, Z and $R_1$ have the values given in Formula I, and $R_6$ and $R_7$ each represents an alkyl group, especially methyl, ethyl, n-propyl or n-butyl. These new complex dialkylaminobenzylidene dyes can be prepared, we have found, by condensing one of the 3-aryl-4-thiazolidone dyes represented by Formula I with a p-dialkylaminobenzaldehyde, e. g. p-dimethylaminobenzaldehyde, p-diethylaminobenzaldehyde, etc. Advantageously, the condensations are effected in the presence of a secondary amine, e. g. piperidine, 2-methylpiperidine, 4-methylpiperidine, 6-methylpiperidine, etc. Diluents are advantageously employed, e. g. ethyl, isopropyl, n-propyl or n-butyl alcohols.

The following examples will serve to illustrate further the method of obtaining our new dialkylaminobenzylidene dyes.

*Example 9.—2-[(2-benzothiazolyl ethochloride)-methylene] - 5 - p - dimethylaminobenzylidene-3-phenyl-4-thiazolidone*

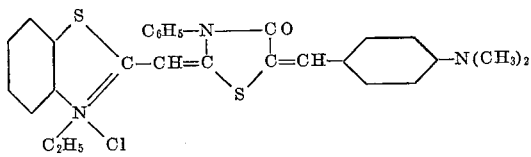

1.94 g. (1 mol.) of 2-[(2-benzothiazolyl ethochloride) - methylene] - 3-phenyl-4-thiazolidone and 0.75 g. (1 mol.) of p-dimethylaminobenzaldehyde were heated together in 10 cc. of ethyl alcohol, in the presence of 2 drops of piperidine, at the refluxing temperature for 25 minutes. After chilling the reaction mixture at 0° C., the above-formulated dye was collected on a filter and washed with methyl alcohol. The yield of dye was 44 per cent crude and 21 per cent after two recrystallizations from methyl alcohol (55 cc. per gram of dye). The very dark crystals of dye had a melting point of 227 to 228° C. with decomposition.

*Example 10.—5-p-dimethylaminobenzylidene-2-[(2-β-naphthothiazolyl ethochloride) methylene]-3-phenyl-4-thiazolidone*

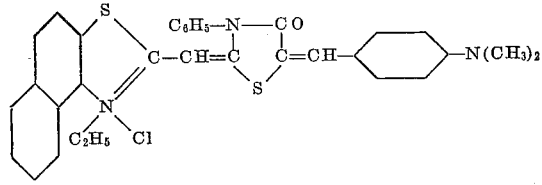

2.19 g. (1 mol.) of 2-[(2-β-naphthothiazolyl ethochloride)methylene] - 3 - phenyl - 4 - thiazolidone, 0.75 g. (1 mol.) of p-dimethylaminobenzaldehyde and 2 drops of piperidine in 10 cc. of absolute ethyl alcohol were heated at the refluxing temperature for 25 minutes. After chilling at 0° C., the product was washed on the filter with methyl alcohol. The yield was 52 per cent crude and 21 per cent after two recrystallizations from methyl alcohol (75 cc. per gram of dye). The dark crystals melted at 176–178° C. and then solidified with lightening of color and then remelted at 267–269° C. with decomposition. The dye sensitized a photographic gelatino-silver-bromoiodide emulsion to about 650 mμ with maximum sensitivity at about 590 mμ.

In a manner similar to that illustrated in the foregoing Examples 9 and 10, any of the dyes of Formula I can be condensed with a dialkylaminobenzaldehyde to give complex dialkylaminobenzylidene dyes of Formula VIII.

The methine dyes containing a 3-aryl-4-thiazolidone nucleus (represented by Formula I) can be condensed with alkyl orthoformates, e. g. ethyl orthoformate, n-propyl orthoformate, n-butyl orthoformate, etc., to give dyes of unknown constitution. The following examples will serve to illustrate further the preparation of these dyes.

*Example 11*

A mixture of 4.33 g. of 2-[(2-benzothiazolyl ethobromide)-methylene] - 3 - phenyl-4-thiazolidone, 2.22 g. of ethyl orthoformate and 15 cc. of dry pyridine was heated at the refluxing temperature for 15 minutes. After chilling the reaction mixture, the solid was collected on a filter and washed with acetone. This residue was dissolved in 500 cc. of methyl alcohol. After chilling the filtrate, there was obtained 0.55 g. which was again recrystallized from methyl alcohol. The dark crystals weighed 0.40 g., had melting point above 315°, and gave a green methyl alcoholic solution with a maximum at 6535 Å.

The filtrate and washings from the two recrystallizations were combined with the mother liquors from the reaction mixture, concentrated, and treated with an aqueous solution of potassium iodide. After chilling, the solid was collected on a filter and washed with water. The residue was stirred in hot acetone, the suspension was chilled and the dye was washed on the filter with acetone. The crude dye was extracted with hot acetone (245 cc.). The residue was recrystallized from 40 cc. of methyl alcohol. The dark green crystals weighed 0.15 g., had melting point 240–241° with decomposition, and gave a deep blue methyl alcoholic solution with a maximum at 6290 Å.

*Example 12*

A mixture of 2.41 g. of 2-[(2-β-naphthothiazolyl ethobromide)methylene]-3-phenyl-4-thiazolidone, 1.11 g. of ethyl orthoformate and 15 cc. of pyridine containing 0.3 cc. of triethylamine was heated at the refluxing temperature for 10 minutes. After chilling the reaction mixture, the solid was collected on a filter and washed with acetone. The dye was twice recrystallized from methyl alcohol. The dark reddish crystals weighed 0.15 g., had melting point 315° with decomposition, and gave a green methyl alcoholic solution with a maximum at 6610 Å.

The filtrate and washings from the two recrystallizations were combined with the mother liquors from the reaction mixture, concentrated, and treated with an aqueous solution of potassium iodide. After chilling, the solid was collected on a filter and washed with water. The residue was stirred in hot acetone, the suspension was chilled and the dye was washed on the filter with acetone. The dye was twice recrystallized, first from methyl alcohol and then acetone. The dark crystals weighed 0.25 g., had melting point 214–216° with decomposition, and gave a blue methyl alcoholic solution with a maximum at 6510 Å.

In the preparation of photographic emulsions containing the dyes disclosed herein, it is only necessary to disperse the dyes in the emulsions. The methods of incorporating dyes in emulsions are simple and well known to those skilled in the art. It is convenient to add the dyes to the emulsions from solutions in appropriate solvents. Methanol has proven satisfactory as a solvent for these dyes. Acetone may also be employed. Sensitization by means of these dyes is, of course, primarily directed to the ordinarily employed gelatino-silver-halide developing-out emulsions. The dyes are advantageously employed in the washed, finished emulsions and should, of course, be uniformly distributed throughout the emulsions. The concentration of the dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion, sensitized with one of these dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of these dyes, 10 to 20 mgs. of dye per liter of emulsion suffices to produce the maximum sensitizing effect with the ordinary gelatino-silver-bromide (including bromoiodide) emulsions. With finer-grain emulsions, such as some of the ordinarily employed gelatino-silver-chloride emulsions, somewhat larger concentrations of dye may be necessary to secure the optimum sensitizing effect.

The above statements are only illustrative and are not to be understood as limiting our invention in any sense, since it will be apparent that the dyes can be incorporated by other methods in any of the photographic silver halide emulsions customarily employed in the art. For instance, the dyes may be incorporated by bathing a plate or film upon which an emulsion has been coated, in a solution of the dye in an appropriate solvent. Bathing methods, however, are not to be preferred ordinarily.

The cyclammonium quaternary salts containing a reactive methyl group in the α- or γ-position, which are necessary, for example, to the preparation of the β-arylaminovinyl compounds of Formula V are for the most part known. They can be prepared by heating the corresponding heterocyclic nitrogen base with an alkyl salt, e. g. methyl iodide, ethyl iodide, n-propyl bromide, n-butyl chloride, methyl p-toluenesulfonate, ethyl p-toluenesulfonate, ethyl benzenesulfonate, diethyl sulfate, dimethyl sulfate, etc. using a closed tube for heating where higher temperatures are desired or volatility of the reactants demands. The quaternary iodides and bromides can be converted to the more soluble quaternary chlorides, e. g. by reacting the quaternary bromide or iodide with silver chloride, in boiling methyl alcohol, or in a phenol as described in United States Patent 2,245,249, dated June 10, 1941. Similarly the quaternary bromides can be converted to quaternary acetates by heating with silver acetate in methyl alcohol. Quaternary perchlorates can be formed by treating an ethyl alcoholic solution of the quaternary bromide or iodide with a hot aqueous solution of sodium perchlorate. The aryl quaternary salts cannot be prepared in a manner analogous to that used for the alkyl quaternary salts. 2-methylbenzothiazole phenohalides are described in United States Patent 2,317,357, dated April 27, 1943, and 2,330,203, dated September 28, 1943. 2-methyl-3-phenylthiazolinium bromide can be prepared by heating thioacetanilide and ethylene dibromide together at 115 to 120° C. (See the copending application of L. G. S. Brooker, Serial No. 622,677, filed October 16, 1945, now U. S. Patent 2,441,558, issued May 18, 1948.) 2 - methyl - 3 - (α-naphthyl)thiazolinium bromide can be prepared by heating thioacetyl-α-naphthylamine with ethylene dibromide. (See Brooker application Serial No. 622,677, supra.)

The heterocyclic bases themselves, from which the alkyl quaternary salts can be prepared, are known for the most part. Several of the 2-methylbenzothiazole bases can be prepared by the method of Fries et al., Ann. 407, 208 (1915), in which the appropriate thioacetylaniline is oxidized with alkaline potassium ferricyanide. Thus p-chlorothioacetanilide gives 6-chloro-2-methylbenzothiazole. The thioacetylanilines can be prepared by treating the corresponding acetylaniline with phosphorus pentasulfide in dry benzene or xylenes. The acetylanilines can be prepared by the action of acetic anhydride or acetyl chloride on the corresponding aniline compound. Several of the 2-methylbenzothiazole bases can also be prepared by reducing bis(o-nitrophenyl)disulfides with zinc dust and acetic acid, acetylating the reduction mixture with acetic anhydride and closing the ring by heating the resulting mixture. The bis(o-nitrophenyl)disulfides can be prepared from the corresponding o-bromonitrobenzenes by heating the o-bromonitrobenzene with sodium disulfide in methyl alcohol. Thus 2-bromo-4-chloronitrobenzene gives bis(5-chloro-2-nitrophenyl)disulfide which, on reduction, acetylation of the reduction product and heating gives 2-methyl - 6 - chlorobenzothiazole. 2 - methyl-5-phenylbenzothiazole can be prepared by reducing bis(3-nitro-4-biphenyl)disulfide with zinc and acetic acid and acetylating the reduction product. (See the copending application of Gertrude Van Zandt and L. G. S. Brooker, Serial No. 711,816, filed November 22, 1946, now U. S. Patent 2,515,913, issued July 18, 1950.) 2-methyl-4-phenylbenzothiazole can be prepared by oxidizing o-thioacetamidobiphenyl with an alkali metal ferricyanide. (See the copending application of Gertrude Van Zandt and L. G. S. Brooker, Serial No. 709,414, filed November 13, 1946, now U. S. Patent 2,485,679, issued October 25, 1949.) 2-methylbenzoxazoles can be prepared by treating the appropriate o-aminophenol with an excess of acetic anhydride, distilling off the acetic acid generated in the reaction as it is formed. Thus o-aminophenol and acetic anhydride give 2-methylbenzoxazole. 2-methylbenzoselenazole bases can be prepared by reducing bis(o-nitrophenyl) diselenides with zinc dust and acetic acid, acetylating the reaction mixture with acetyl anhydride, and closing the ring by heating the resulting mixture. The bis(o-nitrophenyl)diselenides can be prepared from the corresponding o-bromonitrobenzenes by heating the o-bromonitrobenzene with sodium diselenide in methyl alcohol. See also Clark, J. Chem. Soc. (London), 1928, 2313.

What we claim as our invention and desire to be secured by Letters Patent of the United States is:

1. The process for preparing a methine dye which comprises condensing a halogen-ester selected from those represented by the following general formula:

$$X_1-CH_2-CO-O-R_2$$

wherein $X_1$ represents a halogen atom and $R_2$ represents a member selected from the group consisting of an alkyl group and an aryl group, with a 2 - arylamino - 2 - thioethylidene compound selected from those represented by the following two general formulas:

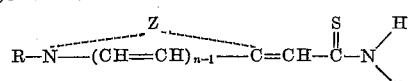

and

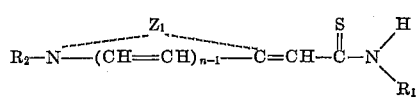

wherein R represents an alkyl group, $R_1$ and $R_2$ each represent an aryl group, $n$ represents a positive integer from 1 to 2, Z represents the non-metallic atoms necessary to complete a heterocyclic nucleus selected from the group consisting of heterocyclic nuclei of the thiazole series, the thiazoline series, the benzothiazole series, the α-naphthothiazole series, the β-naphthothiazole series, the benzoselenazole series, the 3,3-dimethylindolenine series and the quinoline series, and $Z_1$ represents the non-metallic atoms necessary to complete a heterocyclic nucleus selected from heterocyclic nuclei of the benzothiazole series and the thiazoline series.

2. The process for preparing a methine dye which comprises heating a bromo-ester selected from those represented by the following general formula:

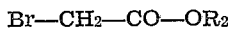

wherein $R_2$ represents an alkyl group of the formula $C_dH_{2d+1}$ wherein $d$ represents a positive integer of from 1 to 4, with a 2-arylamino-2-thioethylidene compound selected from those represented by the following general formula:

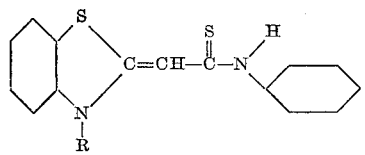

wherein R represents a primary alkyl group of the formula $C_mH_{2m+1}$ wherein $m$ represents a positive integer of from 1 to 4.

3. The process for preparing 2-[(2-benzothiazolyl ethobromide)methylene]-3-phenyl-4-thiazolidone which comprises heating ethyl bromoacetate with 2-(2-anilino-2-thioethylidene)-3-ethylbenzothiazoline.

4. The process for preparing a methine dye which comprises heating a bromo-ester selected from those represented by the following general formula:

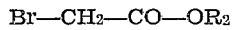

wherein $R_2$ represents an alkyl group of the formula $C_dH_{2d+1}$ wherein $d$ represents a positive integer of from 1 to 4, with a 2-arylamino-2-thioethylidene compound selected from those represented by the following general formula:

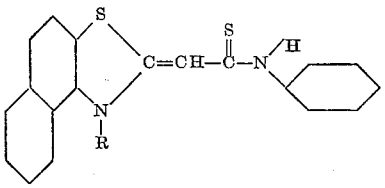

wherein R represents a primary alkyl group of the formula $C_mH_{2m+1}$ wherein $m$ represents a positive integer of from 1 to 4.

5. The process for preparing 2-[(2-β-naphthothiazolyl ethobromide)methylene]-3-phenyl-4-thiazolidone which comprises heating ethyl bromoacetate with 2-(2-anilino-2-thioethylidene)-1-ethyl-β-naphthothiazoline.

6. The process for preparing a methine dye which comprises heating a bromo-ester selected from those represented by the following general formula:

wherein $R_2$ represents an alkyl group of the formula $C_dH_{2d+1}$ wherein $d$ represents a positive integer of from 1 to 4, with a 2-arylamino-2-thioethylidene compound selected from those represented by the following general formula:

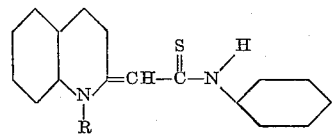

wherein R represents a primary alkyl group of the formula $C_mH_{2m+1}$ wherein $m$ represents a positive integer from 1 to 4.

7. The process for preparing 2-[(2-quinolyl ethobromide)methylene]-3-phenyl-4-thiazolidone which comprises heating ethyl bromoacetate with 2-(2-anilino-2-thioethylidene)-1-ethyl-1,2-dihydroquinoline.

LESLIE G. S. BROOKER.
FRANK L. WHITE.

REFERENCES CITED

The following references are of record in the file of this patent:

UNITED STATES PATENTS

| Number | Name | Date |
|---|---|---|
| 2,153,931 | Barent | Apr. 11, 1939 |
| 2,265,907 | Kendall | Dec. 9, 1941 |
| 2,332,906 | Foldi | Oct. 26, 1943 |

OTHER REFERENCES

Schneider, Berichte de deut. Chem. Gesell, vol. 57 (1924), pp. 522–532.

Ser. No. 387,980, Foldi (A. P. C.), published April 20, 1940.